United States Patent [19]

Schott et al.

[11] 4,316,699
[45] Feb. 23, 1982

[54] WINDMILL STRUCTURE AND POWER GENERATOR

[76] Inventors: Lawrence A. Schott, 15940 Warwick Rd., Detroit, Mich. 48223; Roger A. Schott, 15060 Seminole, Redford, Mich. 48239

[21] Appl. No.: 69,290

[22] Filed: Aug. 24, 1979

[51] Int. Cl.³ .......................... F03D 1/06; F03D 7/04
[52] U.S. Cl. .................................. 416/139; 416/51; 416/237
[58] Field of Search .................. 416/139 A, 11, 44 A, 416/51 A, 237 R, 132 B, 243 R, 243 A, DIG. 3, 237

[56] References Cited

U.S. PATENT DOCUMENTS

| 17,384 | 5/1857 | Mitchell | 416/139 A |
|---|---|---|---|
| 87,628 | 3/1869 | Brown | 416/139 A |
| 151,932 | 6/1874 | St. Clair | 416/51 A |
| 187,256 | 2/1877 | Dana | 416/139 A |
| 201,560 | 3/1878 | Shellabarger | 416/DIG. 3 X |
| 315,484 | 4/1885 | Cosby | 416/237 X |
| 361,709 | 4/1887 | McMaster | 416/136 |
| 442,694 | 12/1890 | McDonald | 416/237 X |
| 542,305 | 7/1895 | Fuller | 416/139 A |
| 596,553 | 1/1898 | Sörensén | 416/243 X |
| 1,713,866 | 5/1929 | D'Asseler | 416/44 A X |
| 1,829,062 | 10/1931 | Schneider | 416/DIG. 3 X |
| 1,844,640 | 2/1932 | Cutler et al. | 416/DIG. 4 UX |
| 1,980,614 | 11/1934 | Davy | 416/DIG. 3 X |
| 2,049,655 | 8/1936 | Lung | 416/DIG. 3 X |
| 2,996,120 | 8/1961 | McGregor | 416/237 X |
| 3,874,816 | 4/1975 | Sweeney | 416/139 A |
| 3,902,072 | 8/1975 | Quinn | 290/44 |
| 3,953,149 | 4/1976 | Henne | 416/136 |
| 4,029,434 | 6/1977 | Kenney | 416/139 A X |
| 4,039,849 | 8/1977 | Mater et al. | 290/55 |
| 4,088,352 | 5/1978 | Kling | 290/55 |
| 4,111,601 | 9/1978 | Richard | 416/41 |
| 4,118,637 | 10/1978 | Tackett | 290/55 |
| 4,213,737 | 7/1980 | Gerhardt | 416/237 X |

FOREIGN PATENT DOCUMENTS

| 805388 | 5/1951 | Fed. Rep. of Germany | 416/44 A |
|---|---|---|---|
| 895128 | 10/1953 | Fed. Rep. of Germany | 416/139 A |
| 614823 | 12/1926 | France | 416/132 B |
| 2292878 | 6/1976 | France | 416/132 B |
| 66770 | 7/1941 | Norway | 416/139 A |
| 193827 | 3/1924 | United Kingdom | 416/139 A |

Primary Examiner—Everette A. Powell, Jr.
Attorney, Agent, or Firm—Barnes, Kisselle, Raisch & Choate

[57] ABSTRACT

A windpower generator which includes a cupped blade design to be assembled from flat module sheets together with a resiliently biased mount to provide automatic feathering with a consequent speed control. A generator or alternating generator to feed electric output to an existing power system, as, for example, a residence or small business establishment, is associated with the windmill to serve as a counterbalance in the mounting and to cooperate with the self-governing blade assembly. A switching circuit is connected to feed generator power to the local utility power lines when net power is available at the winddriven alternator and in phase with utility power.

3 Claims, 9 Drawing Figures

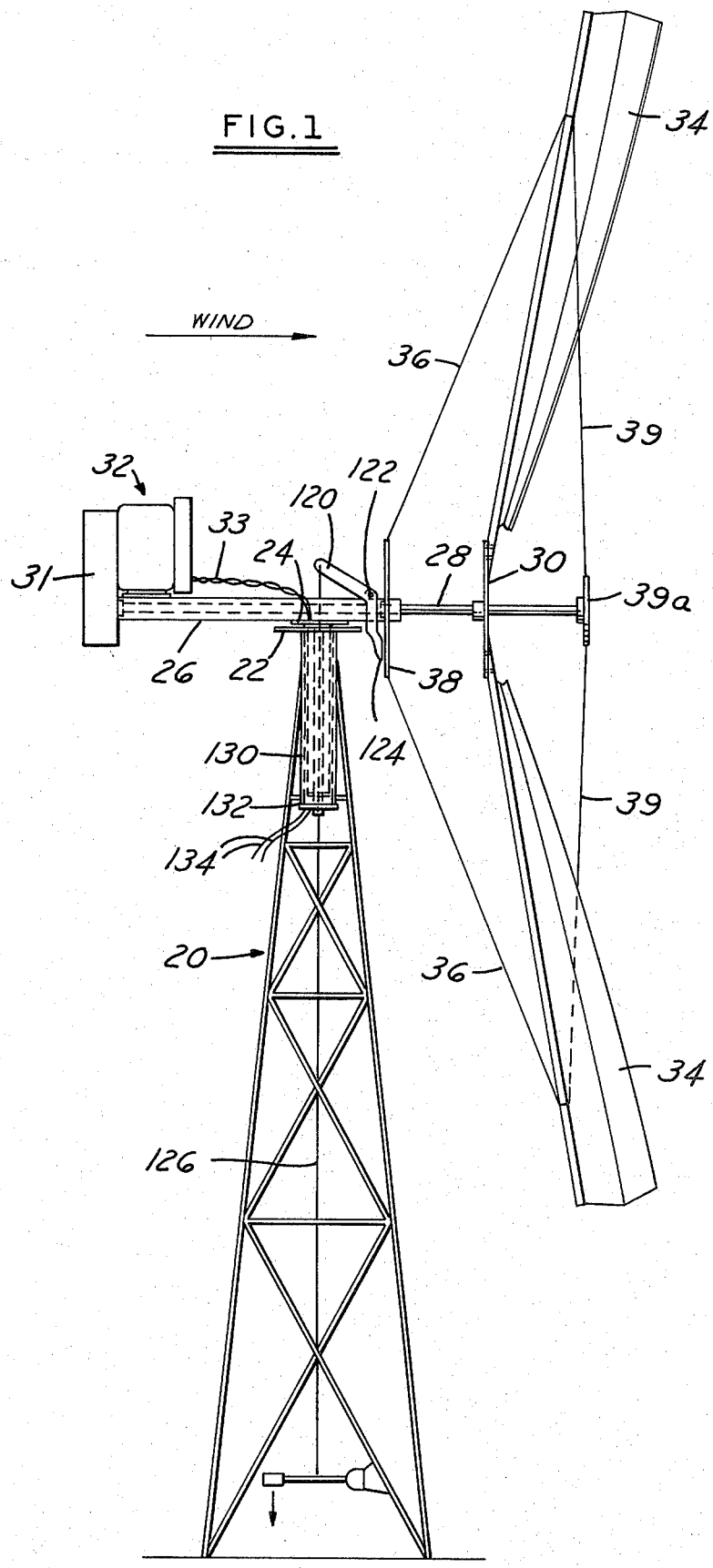

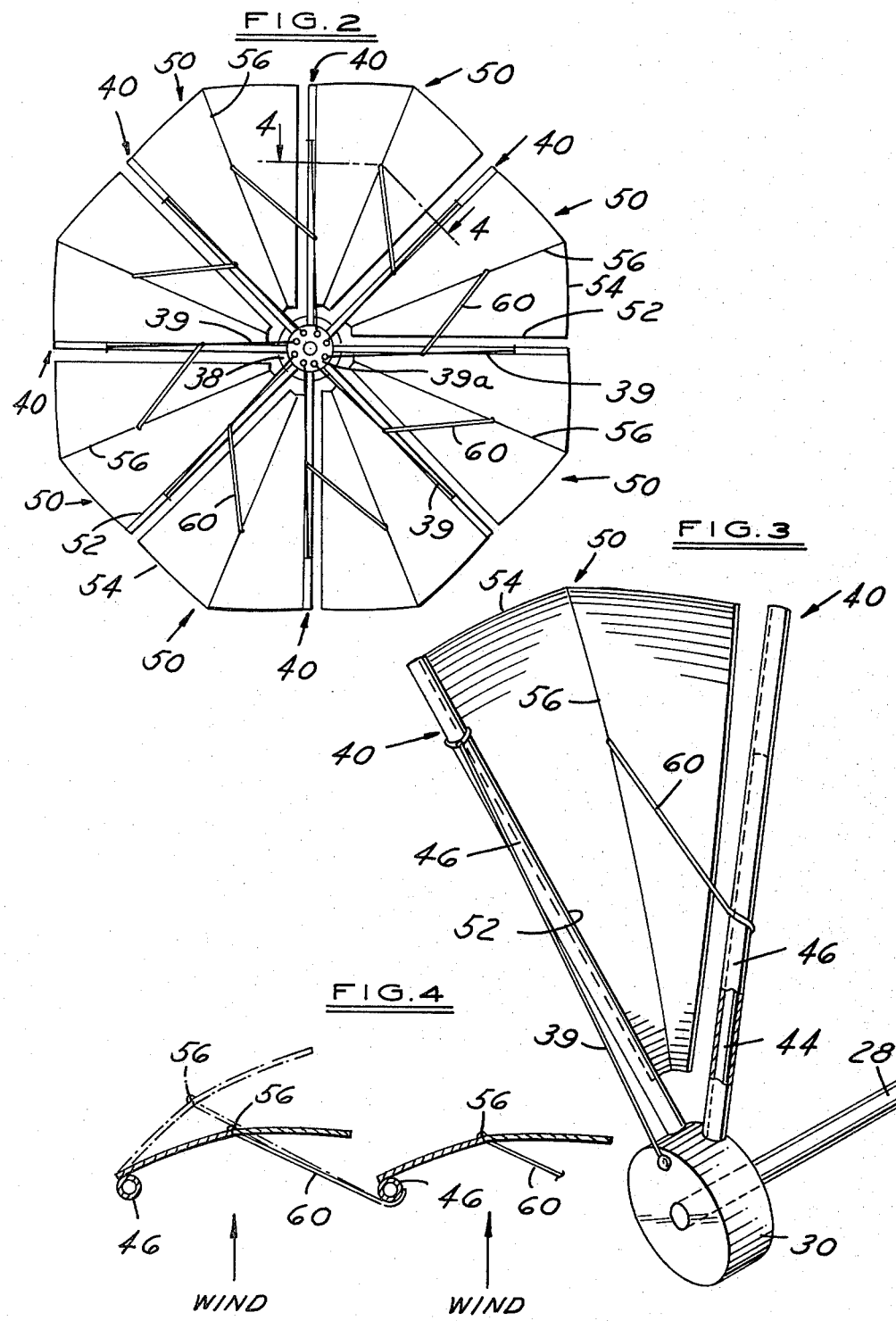

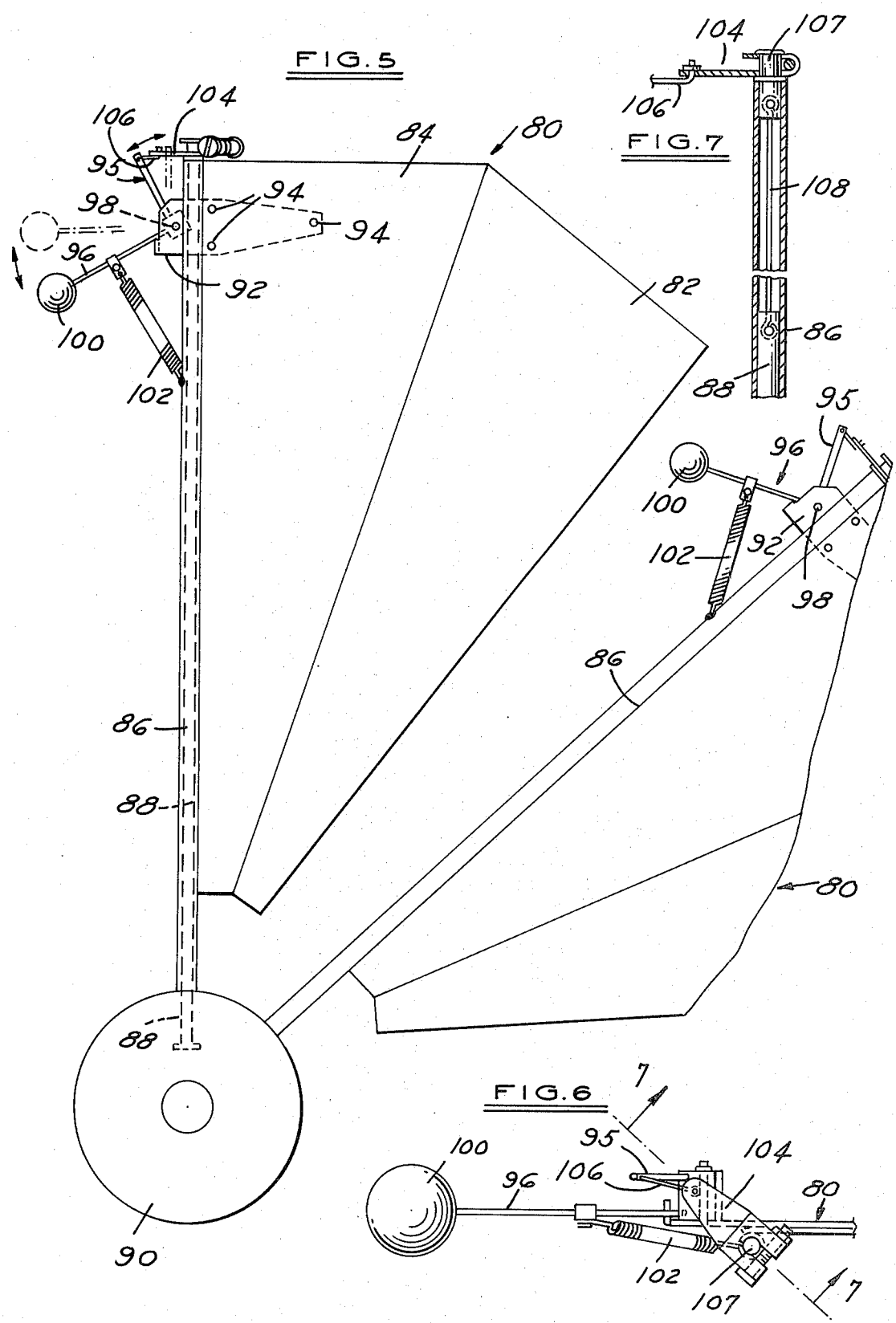

WINDMILL STRUCTURE AND POWER GENERATOR

FIELD OF THE INVENTION

Generation of power utilizing windmill structures and electric alternating current generators.

BACKGROUND OF INVENTION AND OBJECTS

In the economy of the present time, the problem of energy sources is becoming increasingly acute. The greatest, the most plentiful, and most evenly distributed power on earth is windpower which has been used for generations to drive various man made devices but never to any great extent. The present invention is directed to a windmill which, with its large blade area, will start to deliver usable power at very low wind speed, and yet be able to maintain that exact speed in any wind. The device incorporates automatic feathering of the blades to prevent runaway if the load is removed. The invention also contemplates a unique blade design which is inexpensive and yet provides a cupped blade for highest strength and efficiency. Another feature is the combination of the automatic feathering and self-speed governing design with a 60-cycle alternating electric generator and a special phasing in and disconnecting device which can hook it in to an existing power system in phase and provide supplemental power to take some or all of the load off the community utility power sources. When there is more power than is used locally, it feeds back into the utility lines and is sold to other utility company customers.

Other objects and features of the design including details of construction and operation will be apparent in the following description and claims wherein the principles of the invention are set forth together with details of construction which will enable a person skilled in the art to practice the invention, all this in connection with the best mode presently contemplated for the invention.

BRIEF DESCRIPTION OF THE DRAWINGS

Drawings accompany the disclosure and the various views thereof may be briefly described as:

FIG. 1, side view of an assembled windmill and generator.

FIG. 2, a front view of a composite windmill blade assembly.

FIG. 3, a perspective view of a windmill blade.

FIG. 4, a blade sectional view on line 4—4 of FIG. 2.

FIG. 5, a view of a modified blade regulator and counterbalance.

FIG. 6, a top view of a blade regulator.

FIG. 7, a sectional view on line 7—7 of FIG. 6.

Figure 8:
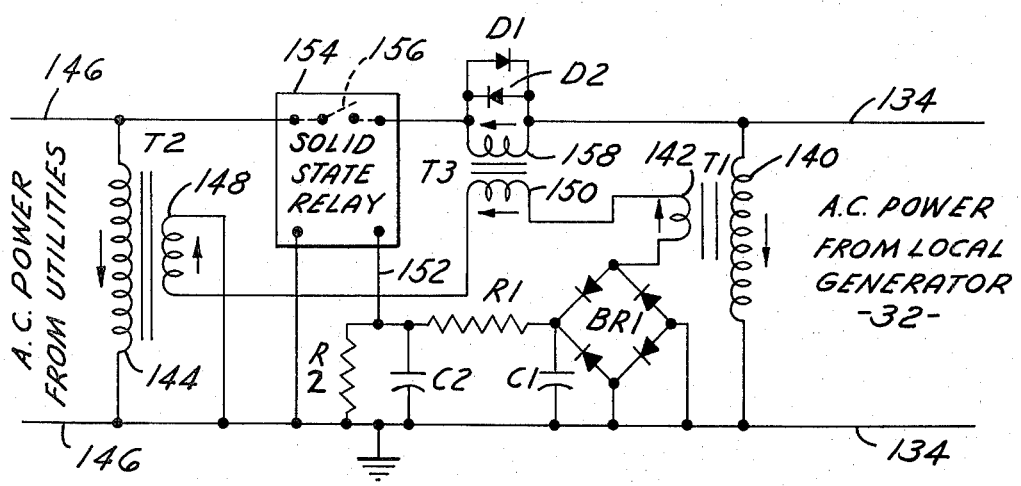
FIG. 8, an electrical schematic drawing of a phase detection and switching circuit in accordance with the invention.

DETAILED DESCRIPTION OF THE INVENTION AND THE MANNER AND PROCESS OF MAKING AND USING IT

In FIG. 1, a structural tower 20 supports a bearing disc 22 on which a disc 24 is rotatably mounted. A bearing tube 26 for an operating shaft 28 is supported on disc 24. Shaft 28 mounts at one end a blade support disc 30 and at the other end a generator housing 32 with suitable electrical connections 33 to a power line (not shown) leading to the ground level of the support tower. The weight of the generator and the blade assembly to be described are balanced to provide a unit which will move easily on the discs 22–24 and face downwind of the tower. Blades 34 are radially mounted on the disc 30 and stays 36 anchor at one end to the blade masts and at the other end to a disc 38. Rear stays 39 anchor to a disc 39a or shaft 28. The shaft 28 is mechanically connected through a gear interchange 31 to the generator shaft (not shown).

The side view of the windmill, as illustrated in FIG. 1, shows the blades tipped in the downwind direction from the vertical about 7° and this angle may vary somewhat with installations and average wind velocities. This provides an overall conical recess behind the blades in the downwind direction and, because of a central vacuum or vortex effect, will insure that the vector velocity of the wind force will hit the blades as nearly perpendicular as possible, thus contributing to an efficient use of available wind. The blades have a concave surface, as will be described, which faces the wind direction.

The conical blade assembly and pivotal mounting of the blade-generator assembly on discs 22 and 24 keeps the blades properly headed with respect to the wind.

In FIG. 2, a face-on view of a blade assembly shows the central hub 30 with radial staff rods 40 extending from the hub in circumferentially spaced relation, one for each blade. It must be appreciated that it is contemplated that these rods and the blades may have a radius dimension of 10' to 20' or more. Guy wires 39 are strung from the end of each staff 40 to the hub as shown in FIGS. 1, 2 and 3.

Each staff is composed of an inner rod 44 (see FIG. 3), which is fixed in the hub 30, and a tube 46 which is designed to rotate on the inner rods. The guy wires 39 are affixed to the tubes to retain them against motion due to centrifugal force and also to resist bending due to wind force. Other retainers might also be used.

Wind receiving blades 50 are mounted at one edge on the respective tubes 46. These blades are fashioned from two flat pieces of slightly flexible material. These pieces are triangular in shape with two straight edges 52 and 54 and a slightly convex edge 56. When the convex edges are secured together by fasteners, the composite blade forms a surface with a double concavity as illustrated in the sectional view of FIG. 4. Thus, the blades are formed with a pocket to catch the wind, that is, the concave side faces into the wind.

Each blade is resiliently biased by elastic tension members 60 which anchor at one end at the center of the blade about two-thirds the distance from the center and at the other end on an adjacent staff about one-third the distance from the center. Thus, each blade is resiliently restrained from swinging back with the wind to a feathering position. The members 60 can be elastic cables or tension springs calibrated to allow feathering as wind velocity increases to prevent a runaway condition in high wind velocities or gusts.

Thus, a steady speed can be maintained with the generator 32 in phase with the utility power despite changes in wind velocity since once the generator is in phase, it resists being moved out of phase.

In FIGS. 5, 6 and 7, a modified version of the blade speed regulation is illustrated. Each convex-concave blade 80, formed of the triangular segments 82 and 84, is again mounted on a tube 86 rotatable on a radial mount mast rod 88 anchored in rotor 90.

A plate 92 is mounted on the outboard end of segment 84 by bolts or rivets 94 with a portion projecting past the tube 86. An L-shaped lever with a lower arm 96 and an upper arm 95 is pivoted at 98 on the projecting portion of plate 92. The lower arm 96 of this lever has a governor ball weight 100 at its outer end and is connected about midway of its length to the tube 86 at a point forward of the plane of blade 80, i.e., on a leading surface of the tube, by a tension element such as a spring 102.

The upper arm 95 of the lever is connected to a short arm 104 by a link 106. Arm 104 is mounted on a pin 107, as illustrated in FIG. 7, which is pivotally mounted on the top of tube 86. The pin 107 is secured to one end of a torsion bar 108 which is secured at its other end to mast rod 88. The torsion bar normally exerts a resilient torque on the blade to keep it facing the wind. This also permits the blade to move against the resilience of the torsion bar away from the wind direction and thus adjust itself to the speed of the wind and maintains the proper rotational speed for the power system into which the driven alternator is connected.

When the driven alternator is locked into phase with an alternating current system, it is well known that it will resist forces to move it out of phase. Thus, the windmill will move at predetermined speed and the resilient mount will permit variations in the angle of the blade to permit the generator to maintain this speed. Of course, the stronger the wind within this speed range, the more force is being delivered to the generator, thus increasing the horsepower of the unit.

With an increase in the speed of rotation, the governor ball 100 is moved out by centrifugal force. By motion of arm 95 and arm 104, the action of torsion bar 108 is relieved and thus permits the blade 80 to feather in the direction of the wind when its normal operating speed is exceeded, such as if it were to loose its load, or if the utility power were disconnected. Thus, with a proper calibration of the weight and the spring, an equilibrium condition can obtain to govern the speed of the rotor under varying wind conditions at a somewhat higher speed than when the alternator is in phase with and being speed regulated by the utility power.

Disc 38, FIG. 1, also serves as a brake disc in conjunction with a brake lever 120 pivoted as 122 and having a brake pad 124. The lever 120 is controlled by a cable 126 which passes down through the tower 20. A cylindrical housing 130 depends from pivot plate 22 to support a slip ring assembly 132 of standard construction at its base. Power wires 33 feed through an internal tube, which rotates with the disc 24, and connect to the slip ring assembly 132 which has stationary output wires 134.

FIG. 8 illustrates a presently preferred embodiment of a circuit in accordance with the invention for switching 110 VAC power from wind generator 32 (FIG. 1) to utility power lines when net power is available at the generator and the power output therefrom is in phase with utility power. The circuit in FIG. 8 includes a first transformer T1 having a secondary winding 142 and a primary winding 140 connected by leads 134 to receive power from generator 32. A second transformer T2 has a secondary winding 148 and a primary winding 144 for connection to receive current from the utility power lines 146. Secondary windings 142, 148 are connected in series with the secondary winding 150 of a transformer T3 such that the currents induced in secondary windings 142, 148 are additive when the currents in respective primary windings 140, 144 are in phase.

Secondary 142 is connected through a bridge rectifier BR1 across a capacitor C1, bridge BR1 and capacitor C1 operating as a current-to-voltage converter for supplying a DC voltage signal across the capacitor as a function of the combined AC currents in secondaries 142, 148. A resistive voltage divider R1, R2 is connected in series across capacitor C1, with a smoothing capacitor C2 being connected across resistor R2. The control input 152 of a solid state relay 154 is connected to the junction of resistors R1, R2. Relay 154 is actuated through control input 152 when the DC voltage across resistor R2 is at a threshold level empirically selected to indicate that the current through primary winding 140 indicative of power available at generator 32 is in phase and at least equal to, and preferably slightly greater than, the current in transformer primary winding 144 indicative of power available in the utility lines. Stated differently, the control input 152 operates to close the relay switch indicated schematically in phantom at 156 when net power is available at generator 32. The primary winding 158 of transformer T3 is connected in series with solid state relay switch 156 between generator conductor 134 and utility line 146. A pair of diodes D1, D2 are cross-connected across primary winding 158 to control maximum voltage on primary winding 158 of transformer T3.

In operation, normally open relay switch 156 blocks current flow between generator 32 and utility lines 146 through transformer winding 158, such that secondary winding 150 acts merely as a short circuit conductor. As indicated above, when the current through primary winding 140 is slightly greater than the current through winding 144 and in phase therewith, the threshold of solid state relay control input 152 is reached and switch 156 is closed to feed power from generator 32 to the utility power lines. Secondary winding 150 is connected between windings 142, 148 such that the current therein is additive to the currents in windings 142, 148 as long as net power flows from generator 32 to the utility lines. However, if the generator loses power and net power flows in the opposite direction, the current induced in secondary winding 150 substracts from that in windings 142, 148 such that solid state relay 154 turns off and switch 156 is opened. Thus, generator 32 is protected from damage.

Figure 9:
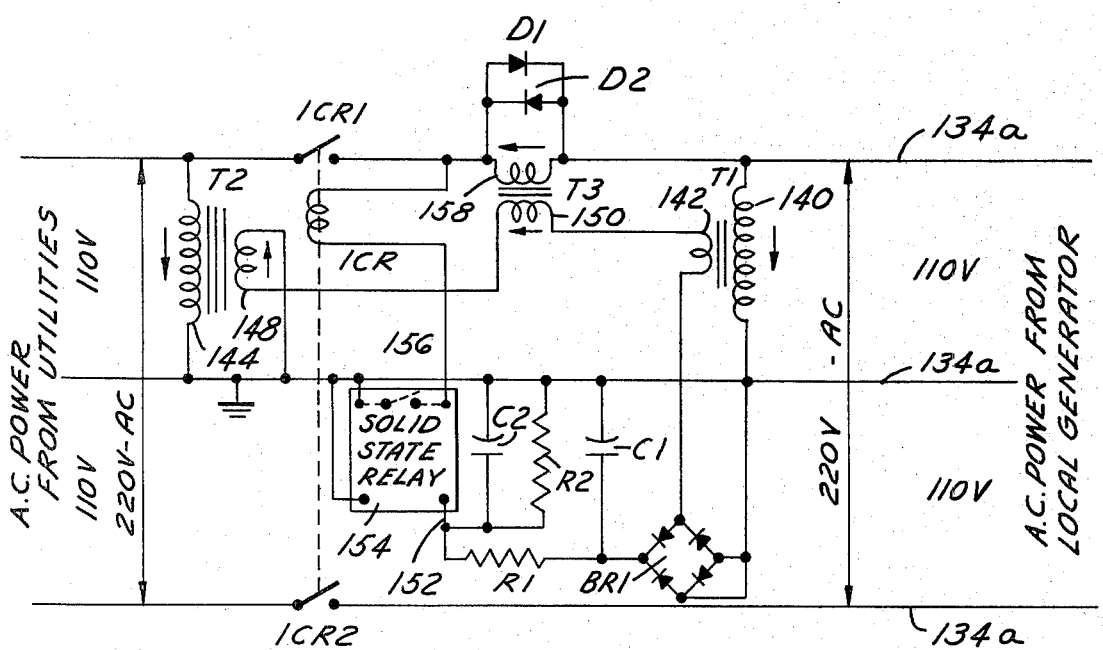
FIG. 9, an electrical schematic of an alternative embodiment to the circuit of FIG. 8.

FIG. 9 illustrates a modified form of the circuit shown in FIG. 8 for use in coupling the output of a 220 VAC wind generator (in place of generator 32 in FIG. 1) to 220 VAC utility lines. The circuit drawing of FIG. 9 is essentially identical to that of FIG. 8, with the exception that the switch element 156 in solid state relay 154 is connected in series with the coil of a relay 1CR having a pair of normally open switch contacts 1CR1 and 1CR2. Relay contacts 1CR1 are connected in series with the primary 158 of transformer T3 to function as previously described. Relay contacts 1CR2 are connected in series between the second hot lines of the 220 VAC power circuit, the third or middle line being grounded in the usual manner.

We claim:

1. In a windmill for developing power for use in energy devices of the type having vanes movable around a radially disposed mounting mast, that improvement which comprises:

(a) a windvane comprising two elongate triangular sheets of relatively rigid non-flaccid material each having a straight side edge and a slightly curved convex side edge joined by a base side edge, said sheets being joined at the convex side edges to form a windvane having in cross-section a concave-convex configuration, and (b) mast means positioned in parallel relation to one of said straight side edges to mount said windvane for rotation about said mast on an axis.

2. A windmill as defined in claim 1 in which each of said masts carries a mounting means freely rotatably associated with said masts, each of said windvanes being fastened on said mounting means, and resilient means comprising a torsion bar connecting each said vane to a respective mast, and means responsive to centrifugal action operatively associated with said torsion bars to relieve resilient bias on said windvanes in response to the speed of rotation of said vanes.

3. A windmill as defined in claim 2 in which said means responsive to centrifugal action comprises an L-shaped lever having one arm of said lever carrying a weight, and the other arm of said lever connected to linkage on said torsion bar.

* * * * *